(12) United States Patent
Chung et al.

(10) Patent No.: US 9,671,542 B2
(45) Date of Patent: *Jun. 6, 2017

(54) METHOD FOR MANUFACTURING POLARIZING FILM

(71) Applicant: InkTec Co., Ltd., Ansan-si (KR)

(72) Inventors: Kwang-Choon Chung, Yongin-si (KR); Insook Yi, Daejeon (KR); MinHee Kim, Ansan-si (KR); Ji Hoon Yoo, Bucheon-si (KR)

(73) Assignee: InkTec Co., Ltd., Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,500

(22) PCT Filed: Jun. 3, 2014

(86) PCT No.: PCT/KR2014/004968
§ 371 (c)(1),
(2) Date: Feb. 23, 2016

(87) PCT Pub. No.: WO2014/196809
PCT Pub. Date: Dec. 11, 2014

(65) Prior Publication Data
US 2016/0202404 A1 Jul. 14, 2016

(30) Foreign Application Priority Data
Jun. 4, 2013 (KR) .................. 10-2013-0063994

(51) Int. Cl.
*G02B 5/30* (2006.01)
*G02B 1/08* (2006.01)

(52) U.S. Cl.
CPC .............. *G02B 5/3058* (2013.01); *G02B 1/08* (2013.01); *G02B 5/3033* (2013.01); *G02B 5/3041* (2013.01)

(58) Field of Classification Search
CPC ...... G06F 3/041; G06F 3/044; G06F 3/03545; G06F 3/0488
See application file for complete search history.

(56) References Cited

U.S. PATENT DOCUMENTS

| 2013/0020110 A1* | 1/2013 | Jo | ................ B29C 43/222 174/251 |
| 2014/0184936 A1* | 7/2014 | Oh | ................ G02F 1/134336 349/12 |
| 2014/0318836 A1* | 10/2014 | He | ................ G02F 1/1333 174/257 |

FOREIGN PATENT DOCUMENTS

| KR | 10-2009-0061225 | 6/2009 |
| KR | 10-2009-0078669 | 7/2009 |

(Continued)

OTHER PUBLICATIONS

International Search Report Dated Aug. 25, 2015 From the Korean Intellectual Property Office Re. Application No. PCT/KR2014/004968 and Its Translation Into English.

*Primary Examiner* — Duy Deo

(57) ABSTRACT

Provided herein is a method for producing a nano polaroid film using a one-pack type or two-pack type blackening ink so that a single layer film may replace a conventional polaroid film generally produced by superposing various types of optical films, and especially, a method for producing a nano polaroid film consisting of one film and having excellent observability by coating a transparent nano pattern substrate with a functional ink that contains a blackening material, and then removing particles formed on protruding portions using an etching solution, and refilling the functional ink into grooves.

20 Claims, 4 Drawing Sheets

(56) References Cited

FOREIGN PATENT DOCUMENTS

| KR | 10-2010-0097957 | 9/2010 |
| KR | 10-2012-0012298 | 2/2012 |
| WO | WO 2010/074518 | 7/2010 |
| WO | WO 2014/196809 | 12/2014 |

* cited by examiner

METHOD FOR MANUFACTURING POLARIZING FILM

RELATED APPLICATIONS

This application is a National Phase of PCT Patent Application No. PCT/KR2014/004968 having International filing date of Jun. 3, 2014, which claims the benefit of priority of Korean Patent Application No. 10-2013-0063994 filed on Jun. 4, 2013. The contents of the above applications are all incorporated by reference as if fully set forth herein in their entirety.

FIELD AND BACKGROUND OF THE INVENTION

The present invention relates to a method for forming a nano polaroid pattern using a blackening ink, and more particularly, to a method for producing a nano polaroid film that consists of one film and that has excellent observability by coating a transparent pattern substrate with a functional ink that contains a blackening material, and then removing particles formed on protruding portions while at the same time refilling the blackening ink into grooves.

Furthermore, the present invention relates to a method for forming a polaroid film having a function of providing a high luminance by using an ink with a high reflectivity when forming a nano polaroid pattern so as to save energy, and by forming the polaroid film in an integral form that consists of one film unlike a conventional polaroid film that consists of multiple films. More specifically, the present invention relates to a method for forming an integral nano polaroid film having a function of providing a high luminance by coating a substrate having nano pattern with a functional ink having a high luminance and then removing particles formed on protruding portions while at the same time refilling the ink with a high reflectivity into grooves.

BACKGROUND

Due to the recent trend of various display devices becoming increasingly lighter and more advanced, demands for polarizing display apparatuses are also increasing. Currently, various types of optical films are being superposed to produce a polaroid film that could adapt to characteristics of the reflectivity and absorbability and the like depending on the usage of the polaroid film.

Currently, technologies for a nano polaroid film in the form of single layer that could replace a polaroid film consisting of multiple layers is attracting a lot of interest, and such techniques will be used very importantly in next generation display panel materials and components such as LCD and 3D displays. Furthermore, forming a polaroid film to have a function of providing a high luminance is very important in terms of saving energy, and such a film may serve as a key material in green industries.

SUMMARY OF THE INVENTION

A conventional blackened polaroid pattern is produced through a post-processing through laser and a sputtering process which is costly. A purpose of the present invention is to provide an economical and environmentally friendly method for forming a blackened nano polaroid pattern by coating a polaroid pattern with a blackening ink, and then selectively etching protruding portions and refilling the ink into grooves of the pattern.

Another purpose of the present invention is to provide a method for producing a blackened nano polaroid pattern wherein the required degrees of blackening (blackness) may be controlled, and therefore satisfies various degrees of blackening without an additional process.

Another purpose of the present invention is to add a function of providing a high reflectivity to a conventional polaroid film, thereby forming a high reflectivity nano polaroid film that saves energy and that is economical and environmentally friendly. Another purpose of the present invention is to provide a method for forming a nano polaroid pattern having a function of providing a high luminance by coating a polaroid pattern using a functional ink showing a high reflectivity, and then selectively etching protruding portions and refilling the ink into grooves.

In order to achieve the aforementioned purposes, according to an embodiment of the present invention, there is provided a method for forming a blackened nano polaroid film (glass), the method comprising preparing a substrate having a transparent polaroid pattern formed thereon, coating the polaroid pattern with a blackening ink, selectively etching protruding portions of the polaroid pattern coated with the blackening ink, and refilling the blackening ink into grooves of the pattern.

Furthermore, in order to achieve the aforementioned purposes, according to another embodiment of the present invention, there is provided a method for preparing a substrate having a transparent polaroid pattern formed thereon, coating the polaroid pattern with a functional ink with a high reflectivity, selectively etching protruding portions of the polaroid pattern coated with the functional ink, and refilling the ink into grooves of the pattern.

According to a method for producing a polaroid film of the present invention, it is possible to form a blackened polaroid pattern using a blackening ink (one-pack type or two-pack type and the like) without using expensive depositing processes such as a post-processing through laser, a sputtering method and the like.

It is possible to form a nano polaroid pattern having a function of providing a high luminance using a functional ink with a high luminance (one-pack type or two-pack type and the like) without using expensive depositing processes such as the post-processing through laser and sputtering method and the like.

Furthermore, by refilling the selectively etched blackening material into the grooves, the method may be used as an economical and environmentally friendly method. Furthermore, by adjusting the composition of the blackening ink, it is possible to realize various degrees of blackening.

The effects of the present invention are not limited to the aforementioned effects, and other effects not mentioned herein may well be understood by those skilled in the art based on the claims attached.

DETAILED DESCRIPTION OF SPECIFIC EMBODIMENTS OF THE INVENTION

Figure 1:
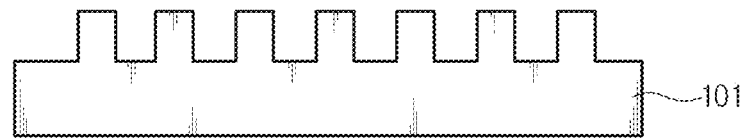
FIGS. 1, 2, 3, 4 and 5 are diagrams sequentially illustrating a method for producing a blackened polaroid pattern according to an embodiment of the present invention.

A method for producing a polaroid film according to the present invention includes a first filling step of filling a blackening conductive ink composition into grooves of a substrate; and a second filling step of dissolving a residue blackening conductive ink composition that remains on a surface of the substrate after being filled into the grooves at the first filling step by an etching solution so that the blackening conductive ink composition may be refilled into the grooves.

The blackening conductive ink composition may comprise a conductive material and a blackening material.

The conductive material may include at least one of a metal complex compound, metal precursor, spherical metal particle, metal flake and nano particle.

The amount of the blackening material included in the blackening conductive ink composition may be 0.1 to 10 weight % (wt %) based on a total weight (100 wt %) of the blackening conductive ink composition.

The blackening material may include a complex compound of titanium, zirconium, manganese, antimony or vanadium, or a combination thereof.

The titanium-based complex compound may include at least one of isopropyl titanate, ethyl titanate, n-butyl titanate, poly-N-butyl titanate, 2-ethylhexyl titanate, n-propyl titanate, octylglycol titanate, tetraisooctyl titanate, xylyl titante monomer, xylyl titante polymer, triethanolamine titante, titanium acetyl acetonate, titanium isopropoxide, ethyl acetoacetic ester titanate, isostearoyl titante, and titanium lactate chelate.

The zirconium-based complex compound may include at least one of triethanolamine zirconate, zirconium lactate, zirconium glycolate, n-butyl zirconate and n-propyl zirconate.

The manganese-based complex compound may include at least one of manganese(III) acetyl acetonate, manganese (III) acetyl acetonate tetrahydrate, manganese(II) acetate, manganese(III) acetate dihydrate, manganese(II) acethyl acetonate, manganese(II) carbonate, manganese(II) carbonate hydrate, manganese(II) hexafluoroacetylacetonate trihydrate, manganese(II) chloride, manganese(II) nitrate tetrahydrate, manganese(II) sulfate monohydrate, manganese(II) sulfide, manganese(II) nitrate hydrate, manganese(II) perchlororate hydrate, manganese(III) fluoride, manganese(II) surfate hydrate, manganese(II) chloride hydrate and manganese(II) chloride monohydrate.

The antimony-based complex compound may include at least one of antimony(III) chloride, antimony(III) acetate, antimony(III) ethoxide, antimony(V) chloride, antimony(V) sulfide, antimony(III) methoxide, antimony(V) fluoride, antimony(III) butoxide, antimony(III) isopropoxide and antimony(III) propoxide.

The vanadium-based complex compound may include at least one of vanadium(III) acetylacetonate, vanadium(II) chloride, vanadium(III) chloride, vanadium(V) oxytriethoxide, vanadium(V) oxychloride, vanadium(IV) chloride, vanadium(V) oxytripropoxide, vanadium(V) oxyfluoride, vanadium(IV) oxide sulfate hydrate, vanadium boride, vanadium(III) bromide and vanadium(III) iodiode.

At the first filling step, the blackening conductive ink composition may be filled into the grooves by an inkjet method, flat panel screen method, spin coating method, bar coater method, roll coating method, flow coating method, doctor blade method, dispensing method, gravure printing method or flexo printing method.

The second filling step may include dissolving the residue blackening conductive ink composition by the etching solution; and inducing the residue blackening conductive ink composition dissolved by the etching solution to be refilled into the grooves.

The etching solution may be applied on the substrate surface to dissolve the residue blackening conductive ink composition.

The etching solution may include at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex and mercapto compound, and an oxidizing agent.

At the second filling step, the residue blackening conductive ink composition may be filled into the grooves by pushing the dissolved residue blackening conductive ink composition into the grooves.

The dissolved residue blackening conductive ink composition may be pushed into the grooves using a doctor blade or brush.

A step of drying the blackening conductive ink composition filled into the grooves at a temperature of 22 to 600° C. may be further included.

Furthermore, a method for producing a polaroid film according to the present invention may be characterized such that the second filling step includes dissolving the residue conductive ink composition having a high reflectivity by the etching solution; and inducing the residue conductive ink composition having a high reflectivity dissolved by the etching solution to be refilled into the grooves.

The conductive ink composition having a high reflectivity includes a conductive material that may be at least one of a metal complex compound, metal precursor, spherical metal particle, metal flake and nano particle. Detailed explanation is the same as in the aforementioned embodiment and thus will be omitted.

Hereinafter, the present invention will be explained in detail with reference to the drawings.

FIGS. 1, 2, 3, 4 and 5 are views sequentially illustrating a method for producing a polaroid film according to an embodiment of the present invention.

Figure 2:
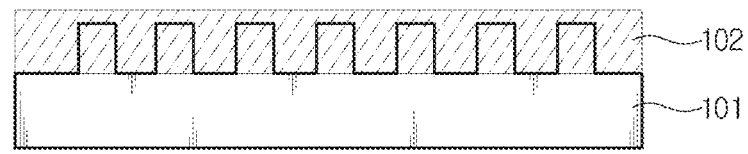
Figure 3:
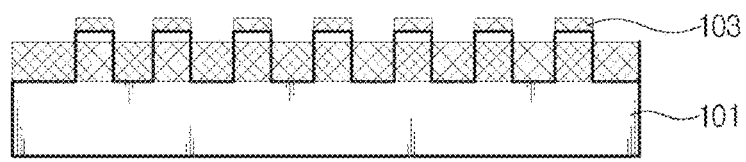
Figure 4:
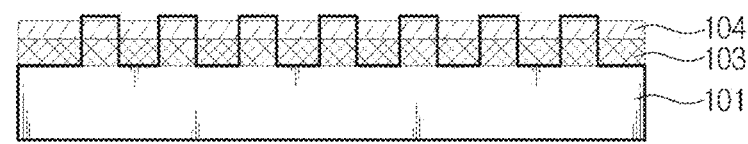
Figure 5:
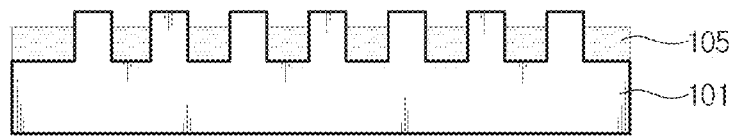

FIG. 1 illustrates a transparent substrate where a fine pattern is formed, FIG. 2 illustrates the transparent polaroid film applied with a blackening improving ink, FIG. 3 illustrates the polarizing substrate applied with the ink and then thermally treated, and FIG. 4 illustrates the polaroid film from which the ink composition on protruding portions has been dissolved by an etching solution and then the ink composition has been refilled into grooves, and FIG. 5 illustrates the polaroid film with improved blackening after a final sintering.

Such a method for producing a polaroid film is capable of forming a blackened polaroid pattern using a blackening ink to produce a single layer nano polarizing film. Herein, the blackening composition may comprise 0.1~10 wt % of a blackening material, and a nano polarized pattern may be formed regardless of the type of the substrate such as a polaroid film, polaroid glass and the like.

Furthermore, the size of the polaroid pattern may be 10~500 nm.

Furthermore, a plasma treatment process may be performed as a pre-treatment on the surface of the pattern substrate to form the blackened nano polaroid film.

The ink composition may include at least one of a conductive material (metal complex compound, metal precursor, spherical metal particle, metal flake or nano particle), insulating material, and semiconductor material.

The blackening material may include a complex compound of titanium, zirconium, manganese, antimony or vanadium, or a combination thereof.

The titanium-based complex compound may include at least one of isopropyl titanate, ethyl titanate, n-butyl titanate, poly-N-butyl titanate, 2-ethylhexyl titanate, n-propyl titanate, octylglycol titanate, tetra isooctyl titanate, xylyl titante monomer, xylyl titante polymer, triethanolamine titante, titanium acetyl acetonate, titanium isopropoxide, ethyl acetoacetic ester titanate, isostearoyl titante, and titanium lactate chelate.

The blackening material may be a titanium-, zirconium-, manganese-, vanadium- or antimony-based compound.

The blackening conductive ink composition may be filled into the grooves by an inkjet method, flat panel screen method, spin coating method, bar coater method, roll coating method, flow coating method, doctor blade method, dispensing method, gravure printing method or flexo printing method.

The etching solution may be applied on the surface of the substrate and dissolve the residue blackening ink composition.

The etching solution may include at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex and mercapto compound, and an oxidizing agent.

The residue blackening conductive ink composition may be filled into the grooves by pushing the dissolved residue blackening conductive ink composition into the grooves.

The dissolved residue blackening conductive ink composition may desirably be pushed into the grooves using a doctor blade or brush.

A step of drying the blackening conductive ink composition filled into the grooves at a temperature of 22 to 600° C. may be further included.

Figure 6:
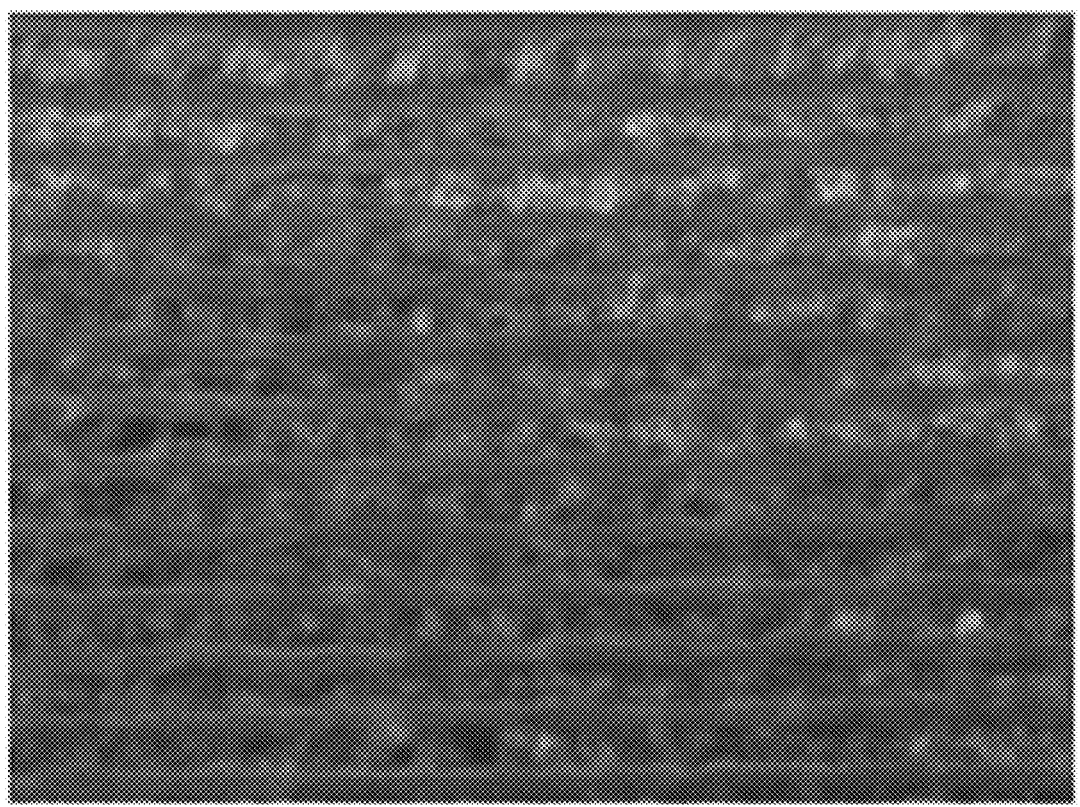
FIG. 6 is an SEM image of a polaroid film wherein an ink with improved blackening has been filled according to an embodiment of the present invention.

FIG. 6 is an image of a polaroid film filled with a blackening improving ink.

FIGS. 7, 8, 9, 10 and 11 are views sequentially illustrating a method for producing a polaroid film according to an embodiment of the present invention.

Figure 7:
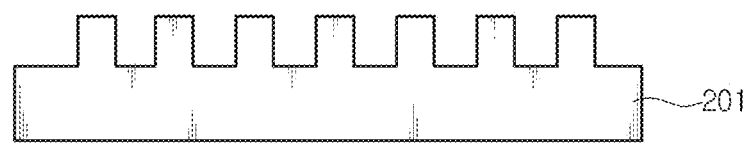
FIGS. 7, 8, 9, 10 and 11 are diagrams sequentially illustrating a method for producing a polaroid film with a high reflectivity according to another embodiment of the present invention.
Figure 8:
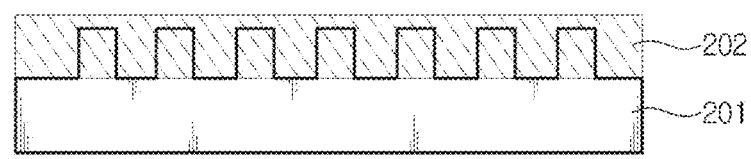
Figure 9:
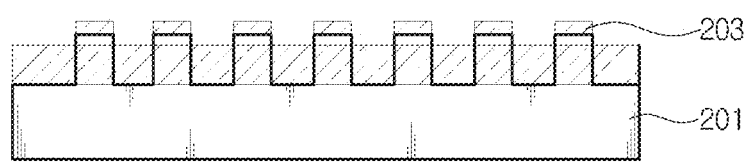
Figure 10:
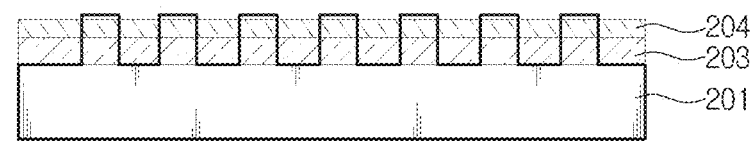
Figure 11:
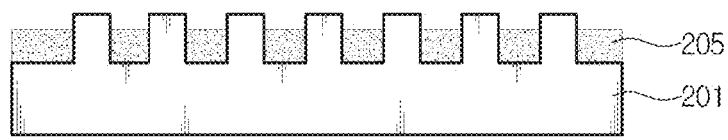

FIG. 7 illustrates a transparent substrate where a fine pattern is formed, FIG. 8 illustrates the transparent polaroid film applied with an ink of a high reflectivity and then thermally treated, FIG. 10 illustrates the polaroid film from which the ink composition on protruding portions has been dissolved by an etching solution and then the dissolved ink composition has been refilled into grooves, and FIG. 5 illustrates the nano polaroid film with a high reflectivity after a final sintering.

By using the high reflectivity functional ink, an integral type nano polaroid film that is one of the polaroid films that may be produced according to the present invention has a high luminance.

When forming the integral type nano polaroid film, a high reflectivity nano polaroid pattern may be formed regardless of the type of the substrate such as a polaroid film, polaroid glass and the like.

The size of the nano polaroid pattern may desirably be 10-500 nm (pattern pitch).

The plasma treatment process may be used as a pre-treatment process on the surface of the pattern substrate.

The ink composition may include at least one of conductive materials such as a metal complex compound, metal precursor, spherical metal particle, metal flake, and nano particle.

The ink composition may be filled into the grooves by an inkjet method, flat panel screen method, spin coating method, bar coater method, roll coating method, flow coating method, doctor blade method, dispensing method, gravure printing method or flexo printing method.

The etching solution may be applied on the surface of the substrate and dissolve the residue ink composition.

The etching solution may include at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex and mercapto compound, and an oxidizing agent.

The residue conductive ink composition may be filled into the grooves by pushing the dissolved residue conductive ink composition into the grooves.

The dissolved residue conductive ink composition may desirably be pushed into the groove using a doctor blade or brush.

A step of drying the conductive ink composition of high reflectivity filled into the grooves of pattern at a temperature of 22 to 600° C. may be further included.

Figure 12:
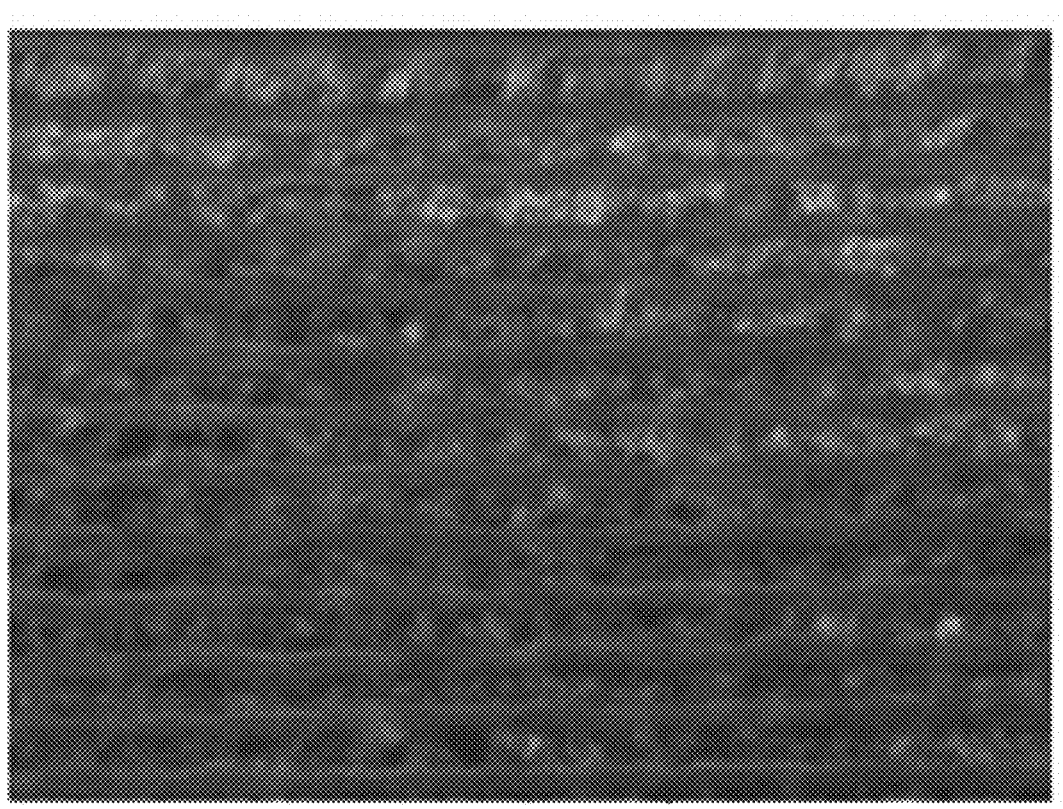
FIG. 12 is an SEM image of a nano polaroid film wherein an ink composition with a high reflectivity has been filled according to an embodiment of the present invention.

FIG. 12 is an image of a nano polaroid film filled with a high reflectivity ink composition.

Hereinafter, the present invention will be explained based on embodiments of a blackened polaroid film. However, the present invention is not limited to those embodiments.

Preparing Example 1

An ink with improved blackening was produced by adding 6.99 g of IPA to 3 g of transparent electronic ink (produced by Inktec) and then stirring the composition with a shaker (JEIO TECH, SK-300) at 250 rpm for 1 hour.

Preparing Example 2

An ink with improved blackening was produced by adding 6.99 g of IPA and 0.05 g of Tyzor AA to 3 g of transparent electronic ink (produced by Inktec) and then stirring the composition with a shaker (JEIO TECH, SK-300) at 250 rpm for 1 hour.

Preparing Example 3

An ink with improved blackening was produced by adding 6.99 g of IPA and 0.01 g of Tyzor AA to 3 g of transparent electronic ink (produced by Inktec) and then stirring the composition with a shaker (JEIO TECH, SK-300) at 250 rpm for 1 hour.

Preparing Example 4

An ink with improved blackening was produced by adding 6.99 g of IPA and 0.05 g of Tyzor AA105 to 3 g of transparent electronic ink (produced by Inktec) and then stirring the composition with a shaker (JEIO TECH, SK-300) at 250 rpm for 1 hour.

Preparing Example 5

An ink with improved blackening was produced by adding 6.99 g of IPA and 0.1 g of Tyzor AA105 to 3 g of transparent electronic ink (produced by Inktec) and then stirring the composition with a shaker (JEIO TECH, SK-300) at 250 rpm for 1 hour.

Preparing Example 6

An ink with improved blackening was produced by adding 6.99 g of IPA and 0.05 g of Tyzor TE to 3 g of transparent electronic ink (produced by Inktec) and then stirring the composition with a shaker (JEIO TECH, SK-300) at 250 rpm for 1 hour.

Preparing Example 7

An ink with improved blackening was produced by adding 6.99 g of IPA and 0.1 g of Tyzor TE to 3 g of transparent electronic ink (produced by Inktec) and then stirring the composition with a shaker (JEIO TECH, SK-300) at 250 rpm for 1 hour.

Preparing Example 8

An ink with improved blackening was produced by adding 9 g of IPA to 1 g of transparent electronic ink (produced by Inktec) and then stirring the composition with a shaker (JEIO TECH, SK-300) at 250 rpm for 1 hour.

Preparing Example 9

An ink with improved blackening was produced by adding 9 g of IPA and 0.015 g of Tyzor TE to 1 g of transparent electronic ink (produced by Inktec) and then stirring the composition with a shaker (JEIO TECH, SK-300) at 250 rpm for 1 hour.

Preparing Example 10

An ink with improved blackening was produced by adding 9 g of IPA and 0.03 g of Tyzor TE to 1 g of transparent electronic ink (produced by Inktec) and then stirring the composition with a shaker (JEIO TECH, SK-300) at 250 rpm for 1 hour.

Preparing Example 11

An ink with improved blackening was produced by adding 9 g of IPA and 0.045 g of Tyzor TE to 1 g of transparent electronic ink (produced by Inktec) and then stirring the composition with a shaker (JEIO TECH, SK-300) at 250 rpm for 1 hour.

Preparing Example 12

An ink with improved blackening was produced by adding 9 g of IPA and 0.015 g of Tyzor LA to 1 g of transparent electronic ink (produced by Inktec) and then stirring the composition with a shaker (JEIO TECH, SK-300) at 250 rpm for 1 hour.

Preparing Example 13

An ink with improved blackening was produced by adding 9 g of IPA and 0.03 g of Tyzor LA to 1 g of transparent electronic ink (produced by Inktec) and then stirring the composition with a shaker (JEIO TECH, SK-300) at 250 rpm for 1 hour.

Preparing Example 14

An ink with improved blackening was produced by adding 9 g of IPA and 0.045 g of Tyzor LA to 1 g of transparent electronic ink (produced by Inktec) and then stirring the composition with a shaker (JEIO TECH, SK-300) at 250 rpm for 1 hour.

Preparing Example 15

400CAM Etchant_hydrogen peroxide 1%

An etchant was produced by adding 1 g [10.42 wt %] of isobutyl carbamate, 8.3 g [86.46 wt %] of isobutylamine, and 0.2 [2.08 wt %] of 95% solution of 2-amino-2-methyl-1propanol, and slowly adding 0.1 g [1.04 wt %] of hydrogen peroxide, and then stirring the composition for 30 minutes.

Preparing Example 16

400CAM Etchant_hydrogen peroxide 3%

An etchant was produced by adding 1 g [10.20 wt %] of isobutyl carbamate, 8.3 g [84.69 wt %] of isobutylamine, and 0.2 [2.04 wt %] of 95% solution of 2-amino-2-methyl-1propanol, and slowly adding 0.3 g [3.06 wt %] of hydrogen peroxide, and then stirring the composition for 30 minutes.

Example 1

3% transparent electronic ink_ref

The ink produced according to Preparing Example 1 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 2

3% transparent electronic ink+Tyzor AA 0.5%

The ink produced according to Preparing Example 2 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 3

3% transparent electronic ink+Tyzor AA 1%

The ink produced according to Preparing Example 3 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 4

3% transparent electronic ink+Tyzor AA105 0.5%

The ink produced according to Preparing Example 4 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 5

3% transparent electronic ink+Tyzor AA105 1%

The ink produced according to Preparing Example 5 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 6

3% transparent electronic ink+Tyzor TE 0.5%

The ink produced according to Preparing Example 6 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 7

3% transparent electronic ink+Tyzor TE 1%

The ink produced according to Preparing Example 7 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 8

1% transparent electronic ink_ref

The ink produced according to Preparing Example 8 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 9

1% transparent electronic ink+Tyzor TE 0.15%

The ink produced according to Preparing Example 9 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 10

1% transparent electronic ink+Tyzor TE 0.3%

The ink produced according to Preparing Example 10 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 11

1% transparent electronic ink+Tyzor TE 0.45%

The ink produced according to Preparing Example 11 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 12

1% transparent electronic ink+Tyzor LA 0.15%

The ink produced according to Preparing Example 12 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 13

1% transparent electronic ink+Tyzor LA 0.3%

The ink produced according to Preparing Example 13 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 14

1% transparent electronic ink+Tyzor LA 0.45%

The ink produced according to Preparing Example 17 was applied on a substrate made of a PET film of which the surface had been modified by a plasma treatment by a spin-coating at a speed of 1000 rpm (5 seconds)/1500 rpm (5 seconds). The coated substrate was sintered at 120° C. for 3 minutes.

Example 15

1% transparent electronic ink_polymer substrate polarization

The ink produced according to Preparing Example 8 was applied on a substrate where a nano pattern had been formed by a spin-coating med at a speed of 1000 rpm (5 seconds)/1500 rpm (5 seconds). The coated substrate was sintered at 120° C. for 3 minutes, and then the etchant produced according to Preparing Example 15 was applied on the coated substrate, and then after 30 seconds the etchant was removed at a speed of 1000 (5 seconds)/1500 (5 seconds) rpm. The etched substrate was sintered at 120° C. for 3 minutes The measurements from the Producing Examples and Examples aforementioned are as shown in Tables 1 to 3 below.

TABLE 1

| Amounts (g) | Transparent electronic ink | IPA | additive |
|---|---|---|---|
| Preparing Example 1 | 3 | 6.99 | — |
| Preparing Example 2 | 3 | 6.99 | 0.05 |
| Preparing Example 3 | 3 | 6.99 | 0.1 |

TABLE 1-continued

| Amounts (g) | Transparent electronic ink | IPA | additive |
|---|---|---|---|
| Preparing Example 4 | 3 | 6.99 | 0.05 |
| Preparing Example 5 | 3 | 6.99 | 0.1 |
| Preparing Example 6 | 3 | 6.99 | 0.05 |
| Preparing Example 7 | 3 | 6.99 | 0.1 |
| Preparing Example 8 | 1 | 9 | — |
| Preparing Example 9 | 1 | 9 | 0.015 |
| Preparing Example 10 | 1 | 9 | 0.03 |
| Preparing Example 11 | 1 | 9 | 0.045 |
| Preparing Example 12 | 1 | 9 | 0.015 |
| Preparing Example 13 | 1 | 9 | 0.03 |
| Preparing Example 14 | 1 | 9 | 0.045 |

TABLE 2

| Amounts (wt %) | Transparent electronic ink | IPA | additive |
|---|---|---|---|
| Preparing Example 1 | 30.03 | 69.97 | |
| Preparing Example 2 | 29.88 | 69.62 | 0.50 |
| Preparing Example 3 | 29.73 | 69.28 | 0.99 |
| Preparing Example 4 | 29.88 | 69.62 | 0.50 |
| Preparing Example 5 | 29.73 | 69.28 | 0.99 |
| Preparing Example 6 | 29.88 | 69.62 | 0.50 |
| Preparing Example 7 | 29.73 | 69.28 | 0.99 |
| Preparing Example 8 | 0.10 | 0.90 | — |
| Preparing Example 9 | 9.99 | 89.87 | 0.15 |
| Preparing Example 10 | 9.97 | 89.73 | 0.30 |
| Preparing Example 11 | 9.96 | 89.60 | 0.45 |
| Preparing Example 12 | 9.99 | 89.87 | 0.15 |
| Preparing Example 13 | 9.97 | 89.73 | 0.30 |
| Preparing Example 14 | 9.96 | 89.60 | 0.45 |

TABLE 3

| | L* | Tt (%) | Haze |
|---|---|---|---|
| Example 1 | 60 | 28 | 2 |
| Example 2 | 51 | 19 | 1 |
| Example 3 | 44 | 14 | 1 |
| Example 4 | 49 | 18 | 1 |
| Example 5 | 43 | 13 | 1 |
| Example 6 | 26 | 4 | 2 |
| Example 7 | 37 | 8 | 1 |
| Example 8 | 73 | 45 | 2 |
| Example 9 | 62 | 30 | 1 |
| Example 10 | 63 | 30 | 2 |
| Example 11 | 66 | 34 | 2 |
| Example 12 | 72 | 43 | 2 |
| Example 13 | 69 | 40 | 1 |
| Example 14 | 69 | 40 | 1 |
| Example 15 | 48 | 44 | — |

Hereinafter, the present invention will be explained based on embodiments of a blackened polaroid film. However, the present invention is not limited to those embodiments.

Preparing Example 17

An ink with improved high reflectivity was produced by adding 6.99 g of IPA to 3 g of transparent electronic ink (produced by Inktec) and then stirring the composition with a shaker (JEIO TECH, SK-300) at 250 rpm for 1 hour.

Preparing Example 18

An ink with improved high reflectivity was produced by adding 9 g of IPA and 0.015 g of Tyzor TE to 1 g of transparent electronic ink (produced by Inktec) and then stirring the composition with a shaker (JEIO TECH, SK-300) at 250 rpm for 1 hour.

Preparing Example 19

An ink with improved high reflectivity was produced by adding 9 g of IPA to 1 g of transparent electronic ink (produced by Inktec) and then stirring the composition with a shaker (JEIO TECH, SK-300) at 250 rpm for 1 hour.

Preparing Example 20

400CAM Etchant_hydrogen peroxide 1%

An etchant was produced by adding 1 g [10.42 wt %] of isobutyl carbamate, 8.3 g [86.46 wt %] of isobutylamine, and 0.2 [2.08 wt %] of 95% solution of 2-amino-2-methyl-1propanol, and slowly adding 0.1 g [1.04 wt %] of hydrogen peroxide, and then stirring the composition for 30 minutes.

Example 16

3% transparent electronic ink_ref

The ink produced according to Preparing Example 17 was applied on a substrate made of a PET film of which the surface had been modified by a plasma treatment by a spin-coating at a speed of 1000 rpm (5 seconds)/1500 rpm (5 seconds). The coated substrate was plasticized at 120° C. for 3 minutes.

Example 17

Adding 1% transparent electronic ink_TE

The ink produced according to Preparing Example 18 was applied on a substrate made of a PET film of which the surface had been modified by a plasma treatment by a spin-coating at a speed of 1000 rpm (5 seconds)/1500 rpm (5 seconds). The coated substrate was plasticized at 120° C. for 3 minutes.

Example 18

1% transparent electronic ink_ref

The ink produced according to Preparing Example 19 was applied on a substrate made of a PET film of which the surface had been modified by a plasma treatment by a spin-coating at a speed of 1000 rpm (5 seconds)/1500 rpm (5 seconds). The coated substrate was plasticized at 120° C. for 3 minutes.

Example 19

1% transparent electronic ink_polymer substrate polarization

The ink produced according to Preparing Example 18 was applied on a substrate where a polarized nano pattern had been formed by a spin-coating at a speed of 1000 rpm (5 seconds)/1500 rpm (5 seconds). The coated substrate was sintered at 120° C. for 3 minutes, and then the etchant produced according to Preparing Example 20 was applied on the coated substrate, and then after 30 seconds the etchant was removed at a speed of 1000 rpm (5 seconds)/1500 rpm (5 seconds). The etched substrate was sintered at 120° C. for 3 minutes.

The measurements from the Producing Examples and Examples aforementioned are as shown in Tables 4 to 6 below.

TABLE 4

| Amounts (g) | Transparent electronic ink | IPA | Additive |
| --- | --- | --- | --- |
| Preparing Example 17 | 3 | 6.99 | — |
| Preparing Example 18 | 1 | 9 | 0.015 |
| Preparing Example 19 | 1 | 9 | — |

TABLE 5

| Amounts (wt %) | Transparent electronic ink | IPA | Additive |
| --- | --- | --- | --- |
| Preparing Example 17 | 30.03 | 69.97 | |
| Preparing Example 18 | 9.99 | 89.87 | 0.15 |
| Preparing Example 19 | 10 | 90 | |

TABLE 6

| | R (%) | L* | T (%) | Haze |
| --- | --- | --- | --- | --- |
| Example 16 | — | 60 | 28 | 2 |
| Example 17 | — | 73 | 45 | 2 |
| Example 18 | — | 48 | 44 | — |

As aforementioned, according to the present invention, it is possible to form a blackened polaroid pattern using a blackening ink (one-pack type or two-pack type and the like) without using an expensive application process of post-treatment through laser or sputtering. Furthermore, it is possible to form a nano polarized pattern having a function of providing a high luminance using a high reflectivity ink (one-pack type or two-pack type and the like) without using without using an expensive application process of post-treatment through laser or sputtering. Furthermore, by refilling the selectively etched blackening material into grooves of a pattern, the process may be economical and environ-mentally friendly. Not only that, it is possible to exhibit various degrees of blackening by adjusting a composition of the blackening ink.

INDUSTRIAL FEASIBILITY

According to the method for producing a polaroid film of the present invention, it is possible to form a blackened polaroid pattern using a blackening ink (one-pack type or two-pack type and the like) without using an expensive application process of post-treatment through laser or sputtering.

What is claimed is:
1. A method for producing a polaroid film, comprising:
    a first filling step of filling a blackening conductive ink composition into grooves of a substrate; and
    a second filling step of dissolving a residue blackening conductive ink composition that remains on a surface of the substrate after being filled into the grooves at the first filling step by an etching solution so that the residue blackening conductive ink composition is refilled into the grooves.
2. The method according to claim 1,
    wherein the blackening conductive ink composition comprises a conductive material and a blackening material.
3. The method according to claim 2,
    wherein the conductive material comprises at least one of a metal complex compound, metal precursor, spherical metal particle, metal flake and nano particle.
4. The method according to claim 2,
    wherein the blackening material is comprised in an amount of 0.1 to 10 wt % in the blackening conductive ink composition.
5. The method according to claim 2,
    wherein the blackening material comprises a complex compound of titanium, zirconium, manganese, antimony or vanadium, or a combination thereof.
6. The method according to claim 5,
    wherein the complex compound of titanium comprises at least one of isopropyl titanate, ethyl titanate, n-butyl titanate, poly-N-butyl titanate, 2-ethylhexyl titanate, n-propyl titanate, octylglycol titanate, tetra isooctyl titanate, xyltitante monomer, xyltitante polymer, triethanolamine titante, titanium acetyl acetonate, titanium isopropoxide, ethyl acetoacetic ester titanate, isostearoyl titante, and titanium lactate chelate.
7. The method according to claim 5,
    wherein the complex compound of zirconium comprises at least one of triethanolamine zirconate, zirconium lactate, zirconium glycolate, n-butyl zirconate and n-propyl zirconate.
8. The method according to claim 5,
    wherein the complex compound of manganese comprises at least one of manganese(III) acetyl acetonate, manganese(III) acetyl acetonate tetrahydrate, manganese (II) acetate, manganese(III) acetate dihydrate, manganese(II) acethyl acetonate, manganese(II) carbonate, manganese(II) carbonate hydrate, manganese(II) hexafluoroacethyl acetonate trihydrate, manganese(II) chloride, manganese(II) nitrate tetrahydrate, manganese(II) sulfate monohydrate, manganese(II) nitrate hydrate, manganese(II) perchlororate hydrate, manganese(III) fluoride, manganese(II) sulfate hydrate, manganese(II) chloride hydrate and manganese(II) chloride monohydrate.

9. The method according to claim 5,
wherein the complex compound of antimony comprises at least one of antimony(III) chloride, antimony(III) acetate, antimony(III) ethoxide, antimony(V) chloride, antimony(V) sulfide, antimony(III) methoxide, antimony(V) fluoride, antimony(III) butoxide, antimony (III) isopropoxide and antimony(III) propoxide.

10. The method according to claim 5,
wherein the complex compound of vanadium comprises at least one of vanadium(III) acethylacetonate, vanadium(II) chloride, vanadium(III) chloride, vanadium(V) oxytriethoxide, vanadium(V) oxychloride, vanadium (IV) chloride, vanadium(V) oxytripropoxide, vanadium(V) oxyfluoride, vanadium(IV) oxide sulfate hydrate, vanadium boride, vanadium(III) bromide and vanadium(III) iodiode.

11. The method according to claim 1,
wherein at the first filling step, the blackening conductive ink composition is filled into the grooves by an inkjet method, flat panel screen method, spin coating method, bar coater method, roll coating method, flow coating method, doctor blade method, dispensing method, gravure printing method or flexo printing method.

12. The method according to claim 1,
wherein the second filling step comprises dissolving the residue blackening conductive ink composition by the etching solution; and
inducing the residue blackening conductive ink composition dissolved by the etching solution to be refilled into the grooves.

13. The method according to claim 1,
wherein the etching solution is applied on the substrate surface and dissolves the residue blackening conductive ink composition.

14. The method according to claim 1,
wherein the etching solution comprises at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex and mercapto compound, and an oxidizing agent.

15. The method according to claim 1,
wherein at the second filling step, the residue blackening conductive ink composition is refilled into the grooves by pushing the dissolved residue blackening conductive ink composition into the grooves.

16. The method according to claim 15,
wherein the dissolved residue blackening conductive ink composition is pushed into the grooves using a doctor blade or brush.

17. The method according to claim 1,
further comprising drying the blackening conductive ink composition filled into the grooves at a temperature of 22 to 600° C.

18. A method for producing a polaroid film, comprising:
a first filling step of filling a conductive ink composition of high reflectivity into grooves of a substrate; and
a second filling step of dissolving a residue conductive ink composition of high reflectivity that remains on a surface of the substrate after being filled into the grooves at the first filling step by an etching solution so that the residue conductive ink composition is refilled into the grooves.

19. The method according to claim 18,
wherein the conductive ink composition of high reflectivity comprises a conductive material, and the conductive material comprises at least one of a metal complex compound, metal precursor, spherical metal particle, metal flake and nano particle.

20. The method according to claim 19,
wherein the second filling step comprises dissolving the residue conductive ink composition of high reflectivity by the etching solution; and
inducing the residue conductive ink composition dissolved by the etching solution to be refilled into the grooves.

* * * * *